United States Patent [19]

Williamson

[11] Patent Number: 5,053,371
[45] Date of Patent: Oct. 1, 1991

[54] CATALYST REGENERATION METHOD WITH THREE-ZONE COMBUSTION GAS ADDITION

[75] Inventor: Robert R. Williamson, Pleasant Valley, N.Y.

[73] Assignee: UOP, Des Plaines, Ill.

[21] Appl. No.: 608,518

[22] Filed: Nov. 2, 1990

[51] Int. Cl.$^5$ .................. B01J 38/44; B01J 38/24; B01J 23/96; C10G 35/12

[52] U.S. Cl. .................. 502/37; 208/140; 423/220; 423/223

[58] Field of Search .................. 502/37; 208/140

[56] References Cited

U.S. PATENT DOCUMENTS

| | | | |
|---|---|---|---|
| 2,908,636 | 10/1959 | Steffgen et al. | 208/140 |
| 2,965,563 | 12/1960 | Steffgen et al. | 208/140 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,825,116 | 7/1974 | Greenwood | 209/141 |
| 4,135,886 | 1/1979 | Kuchar | 422/216 |
| 4,141,690 | 2/1979 | Persico et al. | 422/216 |
| 4,250,018 | 2/1981 | Peters | 208/49 |
| 4,859,643 | 8/1989 | Sechrist | 502/37 |
| 4,880,604 | 11/1989 | Koves | 422/220 |
| 4,977,119 | 12/1990 | Koves | 502/48 |
| 4,980,325 | 12/1990 | Sechrist | 208/140 |

Primary Examiner—Paul E. Konopka
Attorney, Agent, or Firm—Thomas K. McBride; John G. Tolomei

[57] ABSTRACT

A semi-continuous process for combusting coke from catalyst particles in a fixed bed is improved by injecting combustion air for the regeneration section to the three places, upper air to the burn zone, middle air to the chlorination zone and lower air to the burn zone. By this method combustion gas is added the halogenation gas loop which circulates chlorination gas around the chlorination zone in substantially closed system. Any gas that leaves the chlorination zone flows into the burn zone from the chlorination zone. Thus, passing additional air to the chlorination zone increases the oxygen concentration of the chlorination gas to that additional oxygen-containing chlorination gas and chlorination gas with a higher oxygen concentration passes into the burn zone from the chlorination zone. This method adds air for coke combustion and improves platinum dispersion in the halogenation zone.

24 Claims, 2 Drawing Sheets

CATALYST REGENERATION METHOD WITH THREE-ZONE COMBUSTION GAS ADDITION

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons using platinum group metals and a catalyst support are well known and extensively used. One such process is reforming. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In order to combust coke in a typical regeneration zone, a recycle gas is continuously circulated to the burn zone of a regeneration section and a flue gas containing by-products of a coke combustion, oxygen and water is continually withdrawn. Coke combustion is controlled by recycling a low oxygen concentration gas into contact with the coke-containing catalyst particles. The flue gas/recycle gas is continuously circulated through the catalyst particles in a recycle gas loop. A small stream of combustion gas is added to the recycle gas to replace oxygen consumed in the combustion of coke and a small amount of flue gas is vented off to allow for the addition of the combustion gas. The steady addition of combustion gas and the venting of flue gas establishes a steady state condition that produces a nearly constant concentration of water and oxygen in the recycle gas.

After the burn zone, the metal-containing catalyst particles drop to a subadjacent halogenation zone. Chlorine or other halogen-containing gas circulates through the halogenation zone in a halogenation loop. Contact of the catalyst with the halogenation gas redisperses platinum group metal on the catalyst particles. The halogen gas added to the halogenation loop sometimes enters the loop in admixture with air or other oxygen-containing gas.

From the halogenation zone catalyst particles descend into a subadjacent drying zone. A heated gas contacts the catalyst particles and drives moisture from the catalyst. Typically, air or an oxygen-containing gas enters the drying zone as the drying medium and passes upward through the halogenation zone to the burn zone to provide combustion gas.

The three different zones provide three potential places for the introduction of air or an oxygen-containing gas into the regeneration system. These three locations are often referred to as upper, middle and lower air and correspond to the relative positions of the upper burn zone, middle halogenation zone, and lower drying zone.

In continuous or semi-continuous regeneration process, coke laden particles are at least periodically added and withdrawn from a bed of catalyst in which the coke is combusted. Regions of intense burning that extend through portions of the catalyst bed develop as the coke is combusted.

The regenerator holds catalyst undergoing regeneration in one or more catalyst beds. Catalyst beds usually take on one of two configurations, a radial flow arrangement, or a vertical flow arrangement. In either type of bed, catalyst must fall freely through the bed to transfer catalyst and obtain a continuous or semi-continuous regeneration. Radial or vertical gas flow through the bed can interfere with the free movement of catalyst particles and hinder the transfer of particles through the bed during the regeneration process.

Experience has shown that horizontal flow of reactants, in particular, through a radial bed of catalyst can interfere with the gravity flow removal of catalyst particles. This phenomenon is usually referred to as hang-up or pinning and it imposes a constraint on horizontal flow reactor designs. Catalyst pinning occurs when the frictional forces between catalyst pills that resist the downward movement of the catalyst pills are greater than the gravitational forces acting to pull the catalyst pills downward. The frictional forces occur when the horizontal flow vapor passes through the catalyst bed. When pinning occurs, it traps catalyst particles against the outlet screen of the reactor bed and prevents the downward movement of the pinned catalyst particles. In a simple straight reactor bed, or an annular bed with an inward radial flow of vapors, pinning progresses from the face of the outlet screen and as the vapor flow through the reactor bed increases, it proceeds out to the outer surface of the bed at which point the bed is described as being 100% pinned. Once pinning has progressed to the outermost portion of the catalyst bed, a second phenomenon called void blowing begins. Void blowing describes the movement of the catalyst bed away from its outer boundary by the forces from the horizontal flow of vapor and the creation of a void between the inlet screen and the outer catalyst boundary. The existence of this void can allow catalyst particles to blow around or churn and create catalyst fines. Void blowing can also occur in an annular catalyst bed when vapor flows radially outward through the bed. With radially outward flow, void blowing occurs when the frictional forces between the catalyst pills are greater than the gravitational forces, or in other words, at about the same time as pinning would occur with a radially inward flow. Therefore, high vapor flow can cause void blowing in any type of radial or horizontal flow bed.

The production of fines can pose a number of problems in a continuous moving bed design. The presence of catalyst fines increases the pressure drop across the catalyst bed thereby further contributing to the pinning and void blowing problems. Catalyst fines can also accumulate in the narrow openings of the screen surfaces used to retain the catalyst particles thereby plugging these surfaces and requiring a shut-down of the equipment to remove catalyst fines. Catalyst fines are usually more abrasive than the larger catalyst particles and thereby contribute to greater erosion of the process equipment. Finally, the catalyst in many of these hydrocarbon conversion processes is a valuable commodity and the generation, and removal of catalyst fines imposes a direct catalyst cost on the operation of the system. Further discussion of catalyst fines and the problems imposed thereby can be found in U.S. Pat. No. 3,825,116 which also describes an apparatus and method for fines removal.

Where possible, horizontal or radial flow reactors are designed and operated to avoid process conditions that will lead to pinning and void blowing. This is true in the case of moving bed and non-moving bed designs. Apparatus and methods of operation for avoiding or overcoming pinning and void blowing problems are shown in U.S. Pat. No. 4,135,886, 4,141,690 and 4,250,018.

In vertical or axial flow beds, the upward flow of gases therethrough can also pose problems of catalyst hang-up and fluidization. As gas passes upwardly through a bed of particles at low velocity, it migrates through the particles without changing the density of the catalyst bed. As velocity increases, the flow of gas creates drag forces that lift the particles. When these drag forces exceed the weight of the catalyst, frictional forces between the particles drop to zero and the bed approaches a fluidized state. With continued increases in gas velocity, the particles experience lift that tends to transport the particles upwardly out of the bed. Some upward gas flow through the bed is useful since it promotes the movement of catalyst particles by reducing interparticle friction so that the particles flow more as a fluid. However, increasing upward drag forces can suspend catalyst particles and prevent downward catalyst movement. As a result, the upward gas velocity through an axial bed of catalyst particles must be limited to permit gravity flow removal of the catalyst particles.

Accordingly, the problems of hang-up catalyst pinning and void blowing limit the gas velocity through the catalyst beds in the regeneration process. The combustion of a fixed quantity of coke in the regeneration process burns a proportional quantity of oxygen. Supplying the stoichiometric oxygen requirements for the coke combustion demands the circulation of sufficient oxygen through the catalyst bed. Higher oxygen demands during transitory periods of heavy coke burning require a temporary increase in the oxygen supply to the burn zone of the regeneration section. Oxygen delivery to the bed varies with the gas velocity and oxygen concentration in the gas stream. Since gravity removal of catalyst particles may limit the gas flow velocity, the only ways to increase coke combustion within the catalyst bed is to increase the oxygen concentration or the size of the bed. Physical dimensions of the regenerator that determine the size of the bed are not easily changed for temporary fluctuations in the process. Charging more air or other oxygen-containing gas to the burn zone increases the available oxygen for coke combustion. Recycle gas normally has a low oxygen concentration of about 0.5 to 2 mol. %. Passing additional oxygen-containing gas or air into the recycle stream quickly raises the oxygen concentration for more coke burning capacity. It is usually preferred to introduce the additional oxygen containing gas into the recycle stream through the drying zone. However, adding the additional oxygen to the drying zone raises the total gas velocity through the drying zone. At some point additional oxygen containing gas cannot be added to the drying zone without raising the gas velocity through the drying zone to a level that causes catalyst lift or hold-up in the drying zone bed. Thus, at maximum gas velocities, additional air cannot be added to the recycle gas through the drying zone. While it is possible to increase the oxygen concentration in the recycle loop without increasing the gas velocity through the drying zone by using oxygen-enriched air, such a method has a disadvantage of requiring additional equipment for the oxygen-enriched air stream.

INFORMATION DISCLOSURE

U.S. Pat. No. 3,652,231 (Greenwood et al.) shows regeneration apparatus in which a constant-width movable bed of catalyst is utilized. The '231 patent also describes a continuous catalyst regeneration process which is used in conjunction with catalytic reforming of hydrocarbons. U.S. Pat. Nos. 3,647,680 (Greenwood et al.) and 3,692,496 (Greenwood et al.) also deal with regeneration of reforming catalyst. The teachings of patents ('231, '680, and '496) are hereby incorporated in full into this patent application.

It is well known to pass and oxygen-containing gas into the chlorination zone. U.S. Pat. No. 2,908,636 and U.S. Pat. No. 2,965,563 teaches the passage of a chlorine in an air stream to a chlorine treating vessel. Chlorine and air are introduced as a mixture into the treating vessel or air and chlorine may be admitted separately. The effluent of the chlorine and air are vented separately from the process.

In a particular type of catalyst regeneration zone an upper burn zone communicates with a middle chlorination zone and a lower drying zone in a stacked configuration. U.S. Pat. Nos. 3,647,680 and 3,692,496 show this arrangement. In common practice drying air passes countercurrently to the catalyst flow from the burn zone into the chlorination zone. In the chlorination zone the air dilutes a stream of oxygen and optionally steam that enter the chlorination zone. A recycle system constantly recirculates the chlorine, air and possibly steam mixture with a controlled addition of chlorine to adjust and maintain a desired chlorine concentration. A venting of gas from the chlorination zone to the burn zone occurs in an amount that matches the net influx of gas into the chlorination zone. The amount of air needed for chlorination purposes and the drying step determines the amount of oxygen that passes from the chlorination zone and the drying zone to the burn zone. In most cases drying zone operation dictates the amount of air present in the chlorination zone. No air enters the chlorination zone for the purpose of directly increasing the amount of burning that takes place in the burn zone.

U.S. Pat. No. 3,652,231 depicts a regeneration system and process of the type shown in U.S. Pat. Nos. 3,647,680 and 3,692,496. This reference show a line for the direct introduction of air into a halogenation zone of the regeneration system.

It is an object of this invention to provide a method of improve platinum dispersion in the chlorination zone while adding additional air to burn zone.

It is a further object of this invention to provide a method of controlling the operation of a regeneration section to improve platinum dispersion in the halogenation zone and overcome and to increase the oxygen containing gas that enters the halogenation zone and burn zone.

SUMMARY OF THE INVENTION

This invention is a method of operating a regeneration section to increase the concentration of oxygen in the burn zone and improve platinum dispersion in the chlorination zone by adding additional air to chlorination zone. Adding oxygen-containing gas through the halogenation zone avoids any limitation on air addition through the drying zone. Consequently, additional air or oxygen-containing gas can pass through the halogenation zone without raising the oxygen concentration in the burn zone to desired levels without interfering with the operation of the drying zone. Passing additional air through the halogenation zone during heavy coke burns also improves the dispersion of platinum group metals on the catalysts support.

Accordingly, in one embodiment, this invention is an improved method of operating a continuous regeneration system for a reforming process. The regeneration section includes a burn zone, a halogenation zone and a drying zone in serial progression. The process upon which this invention improves passes catalyst particles containing a platinum group metal and having coke deposited thereon to a burn zone and contacts the catalyst particles with an oxygen-containing recycle gas to combust coke from the particles. The recycle gas circulates continuously from a flue gas outlet to a recycle gas inlet in a recycle gas loop from which a vent removes a vent gas comprising combustion products from the recycle loop. A combustion gas comprising an oxygen-containing gas enters the recycle loop in substantially equal mass flow to the amount of vent gas leaving the recycle loop. Catalyst particles pass from the burn zone to the halogenation zone where the catalyst particles contact a halogen-containing gas for the redispersion of platinum group metals on the catalyst. The halogen-containing gas circulates continuously from a halogenation gas outlet to a halogenation gas inlet in a halogenation loop. A halogen enters the halogenation loop in combination with the circulating halogen-containing gas stream to maintain a halogen-concentration in the halogenation loop. Catalyst particles pass from the halogenation zone to a drying zone where an oxygen-containing drying gas contacts the catalyst particles. The oxygen-containing drying gas enters a lower portion of the drying zone and passes upward from the drying zone into the halogen-containing zone where it mixes with the halogen-containing gas to provide combustion gas for the burn zone. At least a portion of the halogen-containing gas passes into the burn zone in order to provide a portion of the combustion gas. This invention improves the method by measuring the oxygen-concentration of the recycle gas to determine the required addition of combustion gas to the regeneration zone and adding at least a portion of the combustion gas needed for the burn zone to the halogen-containing gas flowing from the halogenation gas outlet to the halogenation gas inlet. The combustion gas added to the halogenation zone is an addition to any other oxygen-containing gas that normally enters the halogenation loop.

In another aspect of this invention, the burn zone, halogenation zone and drying zone have a particular configuration and catalyst bed arrangement. The burn zone, halogenation zone and drying zone form a stacked vertical arrangement. An annular catalyst bed that extends vertically through the burn zone and halogenation zone retains the catalyst particles for contact by the recycle gas and halogenation gas. In the improved aspect of this invention, both a dispersion air and a combustion air stream enter the halogenation recycle loop between the halogenation gas outlet and halogenation gas inlet.

In another embodiment, this invention is a method of controlling a continuous reforming catalyst regeneration system. The system includes a serial progression of a burn zone, a halogenation zone and a drying zone. Catalyst particles containing a platinum group metal and having coke deposited thereon enter the burn zone in a first catalyst bed where an oxygen-containing recycle gas contacts the catalyst particles to combust coke. The recycle gas continuously circulates from a flue gas outlet to a recycle gas inlet in a recycle gas loop. Vent gas leaving the recycle loop carries combustion products from the process. Combustion gas comprising an oxygen-containing gas enters the recycle loop in substantially equal mass flow to the amount of vent gas leaving the recycle gas loop. A first oxygen-containing stream enters the recycle gas flowing from the flue gas outlet to the flue gas inlet to provide a first portion of the combustion gas. Recycle gas passes through the first catalyst bed at a first gas velocity that produces a first pressure drop through the bed. Measurement of the oxygen concentration in the recycle gas provide means for generating a first signal representing the oxygen concentration. The addition rate of the first oxygen-containing gas is also measured and a second signal is generated representing the gas addition rate. Catalyst particles pass from the burn zone to the halogenation zone wherein a halogen-containing gas contacts the catalyst particles to redisperse platinum group metals on the catalyst. The halogen-containing gas continually circulates from a halogenation gas outlet to a halogenation gas inlet in a halogenation gas loop. A halogen in an amount determined to maintain a desired halogen concentration is charged to the halogenation loop. Catalyst particles pass from the halogenation zone to a drying zone wherein a second oxygen-containing gas comprising drying gas contacts the catalyst particles in the drying zone. The drying gas initially enters a lower portion of the drying zone and passes through the drying zone at a second superficial velocity that produces a pressure drop through the bed of catalyst particles in the drying zone. Measurement of the second oxygen-containing gas addition provides means for generating a signal representing the second oxygen-containing gas addition rate. From the top of the drying zone, the drying gas passes upwardly into an admixture with the halogen-containing gas. At least a portion of the halogen-containing gas passes into the burn zone to provide, in part, combustion gas for the burn zone. The first, second and third signals are compared with first, second and third set points for the oxygen concentration, first oxygen-containing gas stream addition, and second oxygen-containing gas stream addition, respectively. A third oxygen-containing gas stream enters the halogenation stream flowing from the halogenation gas outlet to the halogenation gas inlet in an amount that prevents the first, second and third signals from exceeding the first, second and third set points.

Another aspect of this invention is a control system that keeps the upper and lower air on constant flow recorder control, senses the oxygen concentration, the flue gas stream and adjusts the flow of middle air in response to the flue gas oxygen requirements.

Other objects, aspects, embodiments and details of this invention are set forth in the following description of the invention.

DETAILED DESCRIPTION OF THE INVENTION

The most common application for this regeneration section is in the removal of coke from catalyst particles that contain a platinum group metal. The oxidation of the coke at high temperatures in the burn zone tends to agglomerate metal crystals on the surface of the catalyst. Temperatures in excess of 700° F. for coke combustion causes agglomeration. This invention is useful for any regeneration section that has a burn zone communicating with and receiving gases from a halogenation zone.

However, the most widely practiced hydrocarbon conversion process to which the present invention is applicable is catalytic reforming. Therefore the discussion of the invention contained herein will be in reference to its application to a catalytic reforming reaction system.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals. Of these, the platinum group metals are preferred with platinum, iridium, rhodium, palladium being particularly preferred. The particles further comprise a halogen combined with a porous carrier, such as a refractory inorganic oxide. The halogen is normally chlorine. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. The particles are usually spheroidal and have a diameter of from about 1/16th to about ⅛th inch (1.5-3.1 mm), though they may be as large as ¼th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reformer will employ a moving bed reaction zone and regeneration section. The present invention is primarily applicable to a moving bed regeneration section but, can offer some advantages to a fixed bed regeneration section as well. Fresh catalyst particles are fed to a reaction zone, which may be comprised of several subzones, and the particles flow through the zone by gravity. Catalyst is withdrawn from the bottom of the reaction zone and transported to a regeneration section where a hereinafter described multi-step regeneration process is used to recondition the catalyst to restore its full reaction promoting ability. Catalyst flows by gravity through the various regeneration steps and then is withdrawn from the regeneration section and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

When using the method of this invention in a batch, continuous, or semi-continuous catalyst regeneration process, catalyst is contacted with a hot oxygen-containing gas stream (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water. Coke content of spent catalyst may be as much as 20% of the catalyst weight, but 5-7% is a more typical amount. Within the hereinafter described burn zone, coke is usually oxidized at temperatures ranging from 900° to 1000° F., but temperatures in burn zone may vary from average temperatures as low as 750° C. to localized regions that may reach 1100° F. or more. The regeneration section also operates at low pressure ranging from atmospheric to less than 5 psig.

Oxygen for the combustion of coke enters what is called a burn zone of the regeneration section in what has been termed a recycle gas. The recycle gas contains a low concentration of oxygen usually on the order of 0.5 to 1.5% by volume. The arrangement of a typical combustion section may be seen in U.S. Pat. No. 3,652,231. As the coke is combusted, the small amount of hydrogen within the coke reacts with the oxygen to form water. Flue gas made up of carbon monoxide, carbon dioxide, water and unreacted oxygen and other non-reactive gases are collected from the combustion section and withdrawn from the regeneration zone as flue gas. Thus, the recycle gas and flue gas form a recycle gas loop wherein flue gas is continually withdrawn from the process mixed with an oxygen-containing gas to replenish consumed oxygen and returned to the combustion section as recycle gas. A small amount of the flue gas is vented off from the process to allow the addition of an oxygen-containing gas called combustion gas or make-up gas. One portion of the oxygen-containing gas is combined with the flue gas to replace, in part, the oxygen consumed by the coke combustion and the combined gas is recycled to the burn zone. More combustion gas also enters the recycle loop through the internal regeneration volume, and in particular the catalyst bed, in a manner hereinafter described. In the past, the oxygen-containing gas was typically air. The amount of air needed in past regeneration processes to replenish the oxygen consumed during the coke combustion is relatively small, about 3% of the volumetric rate of the recycle gas stream.

All of the oxygen supplied to an upper region of the bed is consumed, since an abundant amount of coke is present. As catalyst particles move downward in the bed and coke is removed, a point is reached where less than all of the oxygen delivered is consumed. This is termed the breakthrough point. Typically, breakthrough occurs at a location spaced about half the distance down the total length of the bed in the combustion section. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and therefore the oxidation reaction occurs at a much slower rate.

The combustion of coke also produces water. The only place for the water to escape from the process is in the small amount of vented flue gas. Therefore, the water concentration in the recycle loop increases until the difference between the amount of water entering with the combustion gas streams and the amount of water leaving with the vent stream equal the amount of water produced during the combustion of coke and equilibrium is reached. The water circulating within the recycle gas loop created a constant steam concentration during the coke combustion process. Since water is detrimental to catalyst life, the water concentration in the recycle loop can be lowered by drying the air that supplies combustion gas, installing a drier for the gas circulating in the recycle gas loop or other methods.

The amount of coke that must be combusted in the regenerator section varies with the operation of reactor section. A number of temporary operational changes will increase the coke combustion requirements and necessitate a "heavy coke burn". For example, changing feedstock compositions or varying product requirements may alter the operation of the reactor section zone to a high severity operation. High severity operation almost invariably produces more coke. In addition feedstock contamination or equipment malfunction can result in an upset condition that increase the coke laydown as the reforming reaction takes place. Sulfur contamination commonly causes upset conditions that laydown heavy coke accumulation on the catalyst.

A heavy coke burn consumes additional oxygen in the burn zone. The recycle gas must supply this additional oxygen. Additional oxygen may be supplied to the burn zone by circulating more of a fixed oxygen concentration recycle gas stream to through the burn zone, increasing the concentration of oxygen in the circulating recycle gas or a combination of the two. Increasing the circulation of the recycle gas raises the gas velocity through the catalyst bed and can lead to the aforementioned pinning, void blowing, and hold-up problems. The addition of more combustion gas or make-up gas requires the venting of more flue gas. Rather than add additional combustion gas to the normal combustion gas inlet of the recycle loop or into the drying section of the regeneration zone, additional combustion gas is added to the burn zone via the halogenation zone by the method of this invention. The pressure drop across the bed in the halogenation zone is typically less than the pressure drop across the bed in said burn zone so that the additional gas flow through the bed of the halogenation zone poses no problems. Thus, by this method, it is possible to add approximately 50% of the combustion gas requirements through the halogenation zone by increasing the venting of flue gas from the external piping of the recycle gas loop. The venting of more flue gas offsets the increased addition of combustion gas from the halogenation zone and bring additional oxygen containing gas into the burn zone thereby raising the oxygen concentration.

Combustion gas normally enters the burn zone through an inlet in the external piping of the recycle loop and internally by the passage of drying air upwardly into the bottom of the burn zone catalyst bed. Adding more drying air to the sub-adjacent drying zone and passing that air into the recycle loop through the catalyst bed will also increase the overall oxygen concentration in the recycle loop. The amount of vent gas taken out of the process increases in proportion to the amount of drying air that passes into the catalyst bed. The addition of drying gas into the catalyst bed does not increase the overall gas velocity across the bed since the additional gas is vented downstream of the catalyst bed. However, catalyst hang-up again limits the amount of drying air that can pass through the drying zone and into the burn zone.

Again the halogenation zone is located below the burn zone and above the drying zone. The halogenation step provides the means of incorporating and maintaining the desired level of halogen in the final catalytic composite. The halogen adjustment step employs a halogen, or halogen-containing compound in an air or an oxygen atmosphere. Air or oxygen can enter the halogenation step either with the drying gas from the hereinafter described drying step or with the halogenation gas. The preferred halogen for incorporation into the catalytic composite is chlorine. The preferred halogen or halogen-containing compound utilized during the halogenation step is chlorine, HCl or a precursor of these compounds. The halogen is usually maintained at a concentration of about 500 mole ppm in the gas stream passing through the halogenation loop. An oxygen atmosphere is generally employed and desired in carrying out the halogenation step. Therefore, it is normal to introduce an oxygen stream into the halogenation gas loop in an amount equal to about 1 to 3 percent of the halogen-containing gas. The presence of oxygen aids in the dispersion of the metallic catalyst components on the carrier. In addition a low water concentration can facilitate the halogenation step. The concentration of chlorine in the halogenation section is governed by the Deacon equilibrium equation.

$$HCl + O_2 \rightleftharpoons H_2O + Cl_2$$

Therefore, to the extent that the catalyst entering the halogenation section has a lower water concentration it will shift the equation to the right to produce more chlorine for the halogenation step. Since oxygen aids in the redispersion of platinum, additional benefits are obtained by the method of this invention when the oxygen concentration in the halogenation zone increases. In addition to its halogenation function, oxygen preset in the halogenation continues the burn step by oxidizing residual coke from the deep pores of the catalyst particles. The coke content of catalyst exiting the burn zone is approximately 0.2% or less of the weight of the catalyst. Much of this residual coke is burned off in the halogenation zone. Were catalyst leaving the burn zone to have on it a larger amount of coke, the temperature in the zone below the burn zone would rise to an unacceptably high value, as a result of the heat of combustion. Normally, the halogenation zone temperature will be in the same range as those in the burn zone.

After passing through the burn zone and halogenation zone, the catalyst usually drops into a drying zone for the removal of water formed in the burn zone that remains on the catalyst particles. The typical arrangement for drying the particles charges a heated air stream into the drying section of the regeneration zone and contacts the particles in countercurrent flow. Relatively dry catalyst particles are withdrawn from the bottom of the regeneration zone and the water-containing oxygen gas stream flows upward out of the drying section. Drying zone temperatures are typically in a range of from 750-950° F. As the drying gas continues traveling through and past the halogenation zone it supplies additional oxygen or combustion gas to the burn zone.

Figure 1:
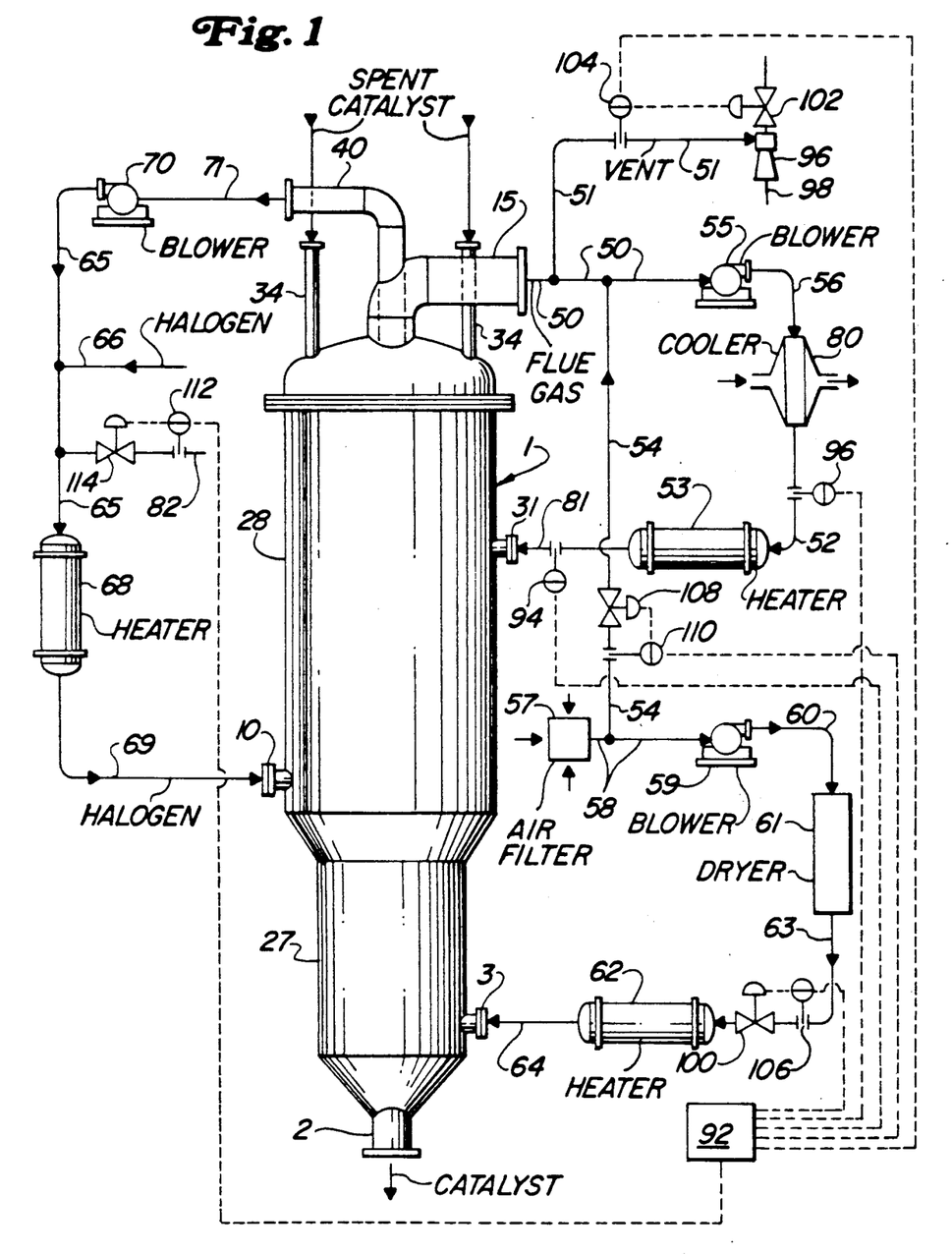
FIG. 1 is a schematic illustration of a regeneration zone and some of the equipment associated therewith.
Figures 2, 3:
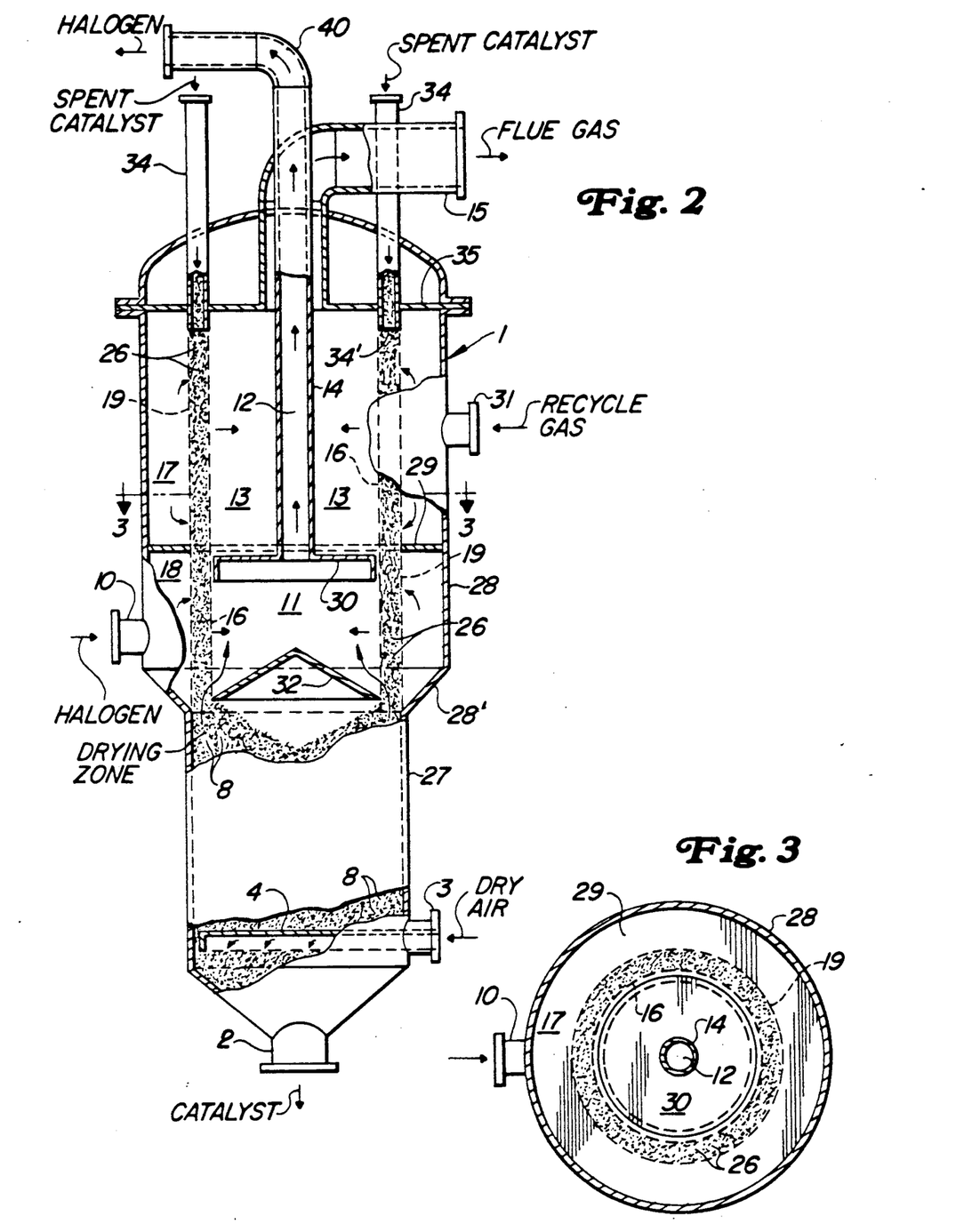
FIG. 2 is a partial cross-sectional elevation of the regeneration zone shown in FIG. 1.
FIG. 3 is a section of the reaction zone taken across line 3—3 of FIG. 1.

FIGS. 1-3 will now be utilized in describing a specific example of the invention; such use is not intended to limit the broad scope of the invention as presented in the claims. The Drawings show only elements and equipment which are essential to a clear understanding of the invention. Application and use of additional required items is well within the purview of one skilled in the art. U.S. Pat. Nos. 3,652,231, 3,647,680 and 3,692,496, which have been made a part of this document, may be consulted for additional detailed information.

Referring now to FIG. 1, spent catalyst particles are introduced into regeneration vessel 1 by means of nozzles 34. Catalyst is removed from regenerator 1 at the lower end through nozzle 2. Regenerator 1 has an upper section 28 and a lower section 27.

Flue gas leaves the upper section of the regeneration vessel through nozzle 15. Flue gas exiting through nozzle 15 is conveyed to blower 55 by pipeline 50. A portion of the flue gas leaving the regenerator through pipeline 50 is vented from the system by pipeline 51. Vent gas is educted from line 51 by a ventury scrubber 96 that uses a caustic flowing through a line 98 as a motor fluid. Line 98 is part of a wash tower system (not shown).

A first portion of the combustion gas requirement is supplied by a combustion gas or make-up gas that comprises air and enters the process through a filter 57 and lines 58 and 54. Once the combustion gas or make-up gas is added to the flue gas, the combined gas stream is usually denoted "recycle gas". Air usually added to the recycle gas through line 52 and a rate of between 0 to 50% of the total combustion gas required for coke oxidation in the burn zone. Recycle gas leaving blower 55 through pipeline 56 enters a cooler 80 that removes heat from the recycle gas loop when burn zone temperatures become too high. After the cooler, a line 52 conveys the recycle gas into a heater 53. A heater 53 heats the combustion gas and line 52 transfers heated combustion gas to the recycle gas stream. Heater 53 heats the recycle gas to carbon-burning temperatures during start-up and to a lesser degree adds heat to the recycle stream when needed during normal operation. A line 81 conveys the recycle stream from the heater into the burn zone through a nozzle 31. Pipelines 50,56,52 and 81 together with a hereinafter described burn zone form a recycle loop.

FIG. 1 also depicts a halogenation loop for performing the halogenation step. A halogenation gas stream is provided to the halogenation zone of the regenerator by nozzle 10. The halogenation gas exits the regenerator through nozzle 40 and is conveyed to heater 68 by pipelines 71 and 65 and by blower 70. Make-up halogen is added to the halogen-containing gas by pipeline 66. Oxygen concentration in the halogen-containing gas stream usually varies from 3 to 25%. An additional portion of the required combustion gas enters the halogenation loop as an additional air or oxygen-containing gas through line 82. After the halogenation gas is heated, it passes through pipeline 69 to regenerator upper section 28. Line 71, 65 and 69 and hereinafter described halogenation zone provide a halogenation loop. In a manner hereinafter described, the majority of the halogenation gas in the halogenation loop is kept separate from recycle gas loop. However, since the recycle loop is essentially closed to outside venting all of the halogenation and combustion gas that enters the halogenation loop is vented into the recycle gas loop.

The drying section also uses air from filter 57. A blower 59 draws air into pipeline 58. The air stream provides a drying gas that passes from blower 59 through a pipeline 60 and into a dryer 61 for water removal before entering a heater 62 via a pipeline 63. The air stream is heated in heater 62 and passed into lower regenerator section 27 via pipeline 64 and nozzle 3. Drying gas is combined with gas circulating through the halogenation loop and eventually exits the process through vent 51. Air usually enters the drying zone at a rate of 50 to 100% of the total combustion gas required to oxidize coke in the burn zone to a desired level. As a result the air stream that provides the drying gas also provides a third portion of the combustion gas.

Referring now to FIG. 2, an outer and an inner catalyst retention screens 16 and 19 extend vertically within the upper section 28 of regeneration vessel 1. Screens 16 and 19 together provide an inlet particle retaining member and an outlet particle retaining member. Outer screen 19 and inner screen 16 are cylindrical in form. The two catalyst retention screens have a central axis common with the central axis of the regeneration vessel. Screens 16 and 19 form a catalyst retention space through which a descending annular column of catalyst shown as bed 26, moves by gravity. Nozzles 34 deliver catalyst at points spaced around the annular bed. The catalyst screens provide perforated walls having openings sufficiently small to preclude catalyst particles from passing therethrough, but allowing gas flow. For a description of catalyst retention means, U.S. Pat. No. 3,652,231 may be consulted. The catalyst retention screens extend throughout the upper section of vessel 1 and deliver catalyst to the lower section 27 of regenerator 1.

The portion of the upper section 28 of vessel 1 above a horizontal partition 29 defines a burn zone. A space for distributing recycle gas around the catalyst bed provides a distributor and is formed between screen 19 and the sidewall of regeneration vessel 1 in upper section 28 and is divided by partition 29. Partition 29 forms a barrier between a recycle gas distribution space 17 and a halogenation gas distribution space 18. Recycle gas enters the space 17 through recycle gas nozzle 31. A partition 35 provides a top closure for space 17. Recycle gas flows radially, or horizontally, from space 17 through bed 26 to a central space 13 which provides a collector. Gas flow across the particle bed 26 is usually restricted to keep the total pressure drop across bed 26 at or below a maximum pressure drop of between 0.5 to 0.75 psi and preferably below 0.4 psi. A halogen conduit 14 occupies a portion of space 13. A lower boundary for central space 13 is provided by enlarged end 30 of conduit 14.

The portion of upper regenerator section 28, located below partition 29, is the halogenation zone. A halogen-containing gas enters the zone via halogenation nozzle 10, flows into halogenation gas distribution space 18, and then flows through the catalyst bed 26 in a radial manner before entering a halogenation collection space 11. A lower boundary of distribution space 18 is formed by a necked-down portion 28' of the regenerator at the bottom of upper section 28. End closure 30 of conduit 14 forms the upper boundary and an end closure 32 forms the lower boundary of collection space 11. The outer edges of end closure 30 are positioned slightly away from screen 16 to allow gas from collection space 11 to mix with the flue gas in space 13 and pass additional combustion gas from the halogenation zone into the recycle gas loop. Thus, additional gas from the halogenation zone can enter the burn zone directly into space 13 or through the bottom of the particle bed 26.

Screen 19 extends a short distance into the lower section 27 of vessel 1, which is of a smaller diameter than the upper section 28. The outside diameter of screen 19 is slightly smaller than the inside diameter of lower section 27. Catalyst discharged from bed 26 fills all of lower section 27 of vessel 1 and forms a bed 8 that consists of a column of catalyst particles and provides a drying section. Catalyst moves downward through the lower section of the vessel and out of the vessel through catalyst outlet nozzle 2.

Nozzle 3 on regeneration vessel 1 is equipped with means consisting of a perforated pipe 4 for distributing drying air across the bottom of bed 8. Pipe 4 distributes air uniformly across the bottom of bed 8 so that the drying gas contacts all of the catalyst in the bed 8. The velocity and resulting pressure drop of the air stream that passes upwardly through bed 8 must be limited to prevent catalyst hold up. For this reason the gas flow through the bed is restricted to maintain a superficial velocity that is at or below a the bulk density of the catalyst in the drying zone. For a typical catalyst this means that the pressure drop should be less than about 0.24 psi/ft. Usually the pressure drop will be less than 60% of the bulk catalyst density or 0.14 psi/ft. Designing the drying zone for a lower pressure drop will offers little benefit since it results in an unnecessarily large diameter vessel in the drying zone.

Air entering the vessel via pipe 4 passes first through the drier so that it contains no more than about 5 parts per million (by volume) of water and then through the heater. The hot air passes upwardly through bed 8 removing moisture from the catalyst. Essentially all of the air passing through the drying zone enters collection space 11. The air stream from the drying zone mixes with gas which has passed through the catalyst from distribution space 18 to collection space 11 and most of the combined stream enters halogen conduit 14 to flow out of the regeneration vessel via halogen nozzle 40 and return via the remainder of the halogenation loop. The vessel internals are designed so that substantially all of the gas in central space 11 enters conduit 14 except for that portion of the gas that is vented from the regenerator through line 51 in the recycle loop.

FIG. 3 depicts a portion of the conduit and screen arrangements. Halogen conduit 14 having an interior 12 is centered on the vertical axis of the vessel. Catalyst retentions screens 16 and 19 enclose the downward moving bed of catalyst 26. Gas in gas distribution space 17 flows radially through the catalyst to central space 13.

The regeneration section can be designed to facilitate the passage of gas from the halogenation section to the space 13. Placing the end portion 30 of conduit 14 below partition 29 leaves a gap across screens 16 and 19 between partition 29 and the top of section 30. This gas promotes the interchange of gas between the collection spaces of the halogenation zone and the burn zone.

For a typical regeneration zone, the rate of catalyst movement through a 6 inch (15.2 cm) constant-width bed may range from as little as 200 pounds per hour (90.7 kg) to 1000 pounds per hour (453.6 kg) or more. Typical bed lengths for this range of catalyst flow rate are from about 4 feet (1.22 m) to about 20 feet (6.1 m). The diameter of the inner catalyst retention screen at the top will often be in excess of 36 inches (0.91 m), in order to accommodate a 36 inch flue gas pipe. Where larger catalyst movement rates are required, bed thickness may be increased. For example, for a 2000 pound per hour (907.2 kg) catalyst flow rate, a constant-width bed may be 9 inches (22.86 cm) thick. Bed length will usually be about 13 feet (5.15 m).

By way of Example shown in FIGS. 1 and 2, the operation of the regeneration zone has been simulated for a typical regeneration operation. The regeneration section as shown in FIGS. 1 and 2, functions in two operational modes. In both cases, the regeneration zone operates at a nominal catalyst regeneration capacity of 2000 lbs/hr. The catalyst circulates through beds 26 and 8 in the manner previously described. It takes the catalyst approximately 8 to 9 hours to make a complete cycle through the regeneration zone with a time of about 3½ hrs. in the burn zone, 3¼ hrs. in the chlorination zone, and 2 hrs. in the drying zone. During the regeneration process, the burn zone operates at a temperature of approximately 890°, the halogenation zone operates at about 950°, and the drying zone operates at about 1050°. Pressures in the burn zone and halogenation zone vary from 0.3 to 0.5 psig and in the drying zone from 0.5 to 1 psig.

During the initial operation, the regeneration section regenerates catalyst particles having a relatively low coke loading of about 3% carbon. As the catalyst passes through bed 26, it is first contacted with approximately 67,000 lbs/hr. of a recycle gas comprising primarily nitrogen and carbon dioxide with an oxygen concentration of about 0.7 mol. %. Passage of the gas through the bed introduces a pressure drop across the bed of approximately 0.2 psi. As the catalyst passes from the burn zone into the halogenation zone, it is contacted with approximately 54,000 lbs/hr. of a halogen-containing gas comprising primarily nitrogen and having an oxygen concentration of about 20 mol. % and a total chloride circulation of about 4 lb-mols/hr. The recycle gas passing through bed 26 creates a pressure drop of about 4 psi. Catalyst drops from the halogenation zone into the drying zone. Approximately, 1500 lb-mols/hr. of air heated to a temperature of 1060° F. enters the bottom of bed 8 in the burn zone. Contact of the catalyst with the drying air removes essentially all water from the catalyst that is withdrawn from the bottom of the regeneration section. The heated air stream from the drying zone passes upwardly into the chlorination zone where it is combined with gas in the halogenation loop. An amount of gas essentially equivalent to the mass volume of the drying gas passes through the catalyst bed and around diverter 30 into space 13 of the recycle gas loop. Effluent gas is withdrawn from the recycle gas collection space 13 at a rate of about 67,000 lbs/hr. Vent 51 withdraws approximately 1570 lbs/hr. of the flue gas as a vent gas stream. As the flue gas circulates through the recycle gas loop, cooler 80 reduces the temperature of the recycle gas from about 950° to 900° F.

Instruments collect data at a number of points around the regeneration sections and processed for control purposes. A flow recorder 90 measures the velocity of the gas stream in the recycle loop and sends a signal to a processor 92. Oxygen concentration in the recycle gas stream is also measured on line by an analyzer 94 and an appropriate signal is carried back to processor 92. The signal from oxygen analyzer 94 is compared in processor 92 with a set point signal to obtain a desired oxygen concentration in a range of from 0.25 to 0.2 mol. % oxygen. As additional oxygen is needed, a control valve 100 is adjusted to increase the flow of oxygen into the drying zone which ultimately causes an increase in the amount of combustion gas that enters the burn zone through the halogenation section. As the additional oxygen-containing gas enters the burn zone and ultimately causes an increase in the volume of gas passing through the regeneration section, a control valve 102 on caustic scrubbing line 98 is opened further to educt an additional volume of gas from the regeneration section and thereby maintain the desired pressure within the regeneration section. Pressure in the regeneration section is monitored through a pressure indicator 104 that senses pressure in the vent line 51. Pressure indicator 104 may operate locally with a fixed pressure value or remotely with a link to processor 92.

Additions in combustion gas requirements are first accommodated by increasing the flow of combustion gas or drying air to the drying zone. Passing air through the drying zone has the advantage of promoting additional catalyst drying within the drying zone. A flow recorder control 106 monitors the gas flow rate through the drying section and sends a representative signal to processor. Alternatively, the processor may monitor the pressure drop across bed 8 using appropriate signals. A high limit in processor 92 or flow recorder control 106 limits the opening of valve 100 to prevent excessive pressure drop or gas velocity through the drying zone. At or before the time that the drying zone reaches its maximum air addition rate, a control valve 108 is opened to initiate air flow or provide additional air flow into the recycle gas loop. A flow recorder control 110 monitors the rate of air flow into the recycle gas loop through lines 54 and 52. Increasing the flow rate of combustion air through line 52 increases the overall gas velocity through lines 56, 81 and the burn zone section of particle bed 26.

At some point, changes in operating conditions increase the carbon content on the catalyst entering the regeneration section from 3 wt. % to 5 wt. %. At such time, processor 92 receives a signal from sensor 94 indicating a deficiency in the oxygen concentration in the recycle gas loop. A flow recorder control 106 indicates that the flow rate of air into the drying zone is at a maximum capacity. Flow recorder control 90 also indicates that the gas flow rate through the recycle loop is at a maximum condition. Controller 92 sends a signal to flow recorder 112 and control valve 114 to inject additional air into the halogenation loop. The additional air raises the oxygen concentration in the halogenation and causes an increase in the gas flow into chamber 13 of the burn zone. The increased gas flow results in a further opening of valve 102 in order to withdraw more vent gas and maintain a fixed pressure condition on vent line 51. The venting of additional gas through line 51 brings the halogen-containing gas which now has a higher oxygen concentration into admixture with the recycle gas that has passed through the burn zone portion of catalyst bed 26. Since the additional volume of gas enters the chamber 13 downstream of the catalyst bed, there is no net increase in velocity through the burn zone portion of catalyst bed 26.

The description of this invention in the context of a preferred regeneration arrangement is not intended to limit its application to the details shown therein. The method of this invention can be used advantageously to control the water content in a recirculating gas stream for any oxygen-consuming process that produces water.

What is claimed is:

1. In a method of operating a continuous regeneration system for a reforming process, said regeneration section including a burn zone, a halogenation zone, and a drying zone in serial progression, comprising:
    (a) passing catalyst particles containing a platinum group metal and having coke deposited thereon to said burn zone and contacting said catalyst particles with an oxygen-containing recycle gas to combust coke from said particles;
    (b) continuously circulating said recycle gas from a flue gas outlet to a recycle gas inlet in a recycle gas loop, venting a vent gas comprising combustion products from said recycle loop, and adding a combustion gas comprising an oxygen-containing gas to said recycle gas loop in substantially equal mass flow to the amount of vent gas leaving the recycle loop;
    (c) passing catalyst particles from said burn zone to said halogenation zone and contacting said catalyst particles with a halogen-containing gas in said halogenation zone and redispersing said platinum group metal on said catalyst;

(d) continuously circulating said halogen-containing gas from a halogenation gas outlet to a halogenation gas inlet in a halogenation loop and adding a halogen to said halogenation gas loop in an amount determined to maintain a halogen concentration in said halogenation loop;

(e) passing catalyst particles from said halogenation zone to a drying zone and contacting said catalyst particles with an oxygen-containing drying gas in said drying zone;

(f) passing said oxygen-containing drying gas to a lower portion of said drying zone;

(g) passing at least a portion of said oxygen-containing drying gas upwardly from said drying zone through said halogenation zone in admixture with said halogenation gas to provide, in part, combustion gas for said burn zone; and, (h) passing at least a portion of said halogenation gas into said burn zone to provide, in part, combustion gas for said burn zone, the improvement comprising:

measuring the oxygen concentration of the recycle gas to determine the required addition of combustion gas to said regeneration zone and adding at least a portion of the combustion gas to satisfy said required addition of combustion gas to the portion of said halogenation gas flowing from said halogenation gas outlet to said halogenation gas inlet and said combustion gas is in addition to any other oxygen-containing gas that enters said halogenation loop.

2. The method of claim 1 wherein said catalyst comprises a platinum group metal on an alumina support and halogen component.

3. The method of claim 2 wherein said platinum group metal comprises platinum.

4. The method of claim 1 wherein said burn zone, halogenation zone, and drying zone are in a stacked arrangement with said burn zone on top and the catalyst progresses through said beds under gravity flow.

5. The method of claim 5 wherein a continuous bed of said catalyst particles extends vertically through said burn zone and said halogenation zone and said recycle gas and said halogen-containing gas flow transversely across said beds.

6. The method of claim 1 wherein said burn zone operates at a temperature of from 750° to 1000° F.

7. The method of claim 1 wherein said recycle gas comprises from about 0.5 to 1.5 mole percent oxygen.

8. The method of claim 1 wherein said halogenation zone is maintained at a temperature of from about 750° to 950° F.

9. The method of claim 1 wherein said drying zone is maintained at a temperature of from about 750° to 950° F.

10. The method of claim 5 wherein the pressure drop across the catalyst bed in said burn zone and said halogenation zone is less than 0.5 psi.

11. The method of claim 4 wherein said drying gas passes vertically through said drying zone and the pressure drop through said drying zone is less than 0.14 psi/ft.

12. The method of claim 1 wherein the amount of oxygen containing gas added to the halogenation loop is at least 50% of the oxygen containing gas added to the regeneration zone.

13. In a method of operating a continuous regeneration system for a reforming process, said regeneration section including a serial progression of a burn zone, a chlorination zone, and a drying zone in a stacked vertical arrangement, comprising:

(a) passing catalyst particles containing a platinum group metal and having coke deposited thereon to the top of said burn zone, retaining catalyst particles in an annular catalyst bed that extends vertically through said burn zone and halogenation zone and contacting said catalyst particles with an oxygen-containing recycle gas by passing said recycle gas radially through said bed to combust coke from said particles;

(b) continuously circulating said recycle gas from a flue gas outlet to a recycle gas inlet in a recycle gas loop, venting a vent gas comprising combustion products from said from said recycle gas as it flow from said flue gas outlet to said flue gas inlet, adding a combustion gas comprising an oxygen-containing gas to said recycle gas loop in substantially equal mass flow to the amount of vent gas leaving the recycle loop, and adding a first portion of an oxygen-containing gas stream as a first portion of said combustion gas to said recycle gas as it flows from said flue gas outlet to said recycle gas inlet;

(c) passing catalyst particles from said burn zone to said halogenation zone and contacting said catalyst particles with a halogen-containing gas in said halogenation zone by passing said halogen-containing gas radially through said annular bed and redispersing platinum particles on said catalyst;

(d) continuously circulating said halogen-containing gas from a halogenation gas outlet to a halogenation gas inlet in a halogenation loop and adding a halogen and a second portion of an oxygen-containing gas stream to said halogenation gas loop as said halogen-containing gas flows from said halogenation gas outlet to said halogenation gas inlet in an amount determined to maintain a halogen concentration in said halogenation loop;

(e) passing catalyst particles from said halogenation zone to a a bed of catalyst particles in said drying zone and contacting said catalyst particles with a drying gas comprising a third portion of an oxygen-containing gas stream in said drying zone;

(f) passing said drying gas upwardly from a lower portion of said drying zone to an upper portion of said drying zone;

(g) passing at least a portion of said drying gas upwardly into said halogenation zone in admixture with said halogenation gas; and, (h) passing at least a portion of said halogen-containing gas vertically into said annular bed in said burn zone to provide, in part, combustion gas for said burn zone, the improvement comprising, measuring the oxygen concentration of the recycle gas to determine the required addition of combustion gas to said halogenation zone and adding a fourth portion of an oxygen-containing gas stream to said halogen-containing gas. flowing from said halogenation gas outlet to said halogenation gas inlet to supply combustion gas to said regeneration zone.

14. The method of claim 13 wherein said fourth portion of said oxygen-containing gas stream increases the oxygen concentration in said recycle loop by 2 to 5%.

15. The method of claim 13 wherein the pressure drop of said halogenation containing gas across said bed is less than the pressure of said recycle gas across said bed.

16. The method of claim 13 wherein said second portion and fourth portion of said oxygen-containing gas streams provide 3 to 50% of the combustion gas entering said process.

17. The method of claim 13 wherein said catalyst comprises a platinum group metal on an alumina support and a halogen component.

18. The method of claim 13 wherein said platinum group metal comprises platinum.

19. The method of claim 13 wherein said burn zone operates at a temperature of from 750° to 1000° F.

20. The method of claim 13 wherein said recycle gas comprises from about 0.5 to 1.5 mole percent oxygen.

21. In the method of claim 13 maintaining said halogenation zone at a temperature of from about 750° to 1000° F.

22. In the method of claim 13 maintaining said drying zone at a temperature of from about 750° to 950° F.

23. In the method of claim 13 venting all of said drying gas, combustion gas, and halogen-containing gas from said regeneration system as said vent gas.

24. A method of controlling a continuous reforming catalyst regeneration system to increase the coke burning capacity of the system, said regeneration section including in serial progression a burn zone, a halogenation zone, and a drying zone, said method comprising:

(a) passing catalyst particles containing a platinum group metal and having coke deposited thereon to said burn zone, retaining catalyst particles in said burn zone as a first catalyst bed and contacting said catalyst particles with an oxygen-containing recycle gas to combust coke from said particles;

(b) continuously circulating said recycle gas from a flue gas outlet to a recycle gas inlet in a recycle gas loop, venting a vent gas comprising combustion products from said recycle loop, adding a combustion gas comprising an oxygen-containing gas to said recycle gas loop in substantially equal mass flow to the amount of vent gas leaving the recycle loop, adding a first oxygen-containing stream to said recycle gas flowing from said flue gas outlet to said recycle gas inlet as a first portion of said combustion gas and passing said recycle gas through said first catalyst bed at a first average superficial velocity;

(c) measuring the concentration of oxygen in said recycle gas and the addition of said first oxygen-containing gas stream and generating a first signal representing said oxygen concentration of said recycle gas and a second signal representing the addition rate of said first oxygen-containing gas;

(d) passing catalyst particles from said burn zone to said halogenation zone and contacting said catalyst particles with a halogen-containing gas in said halogenation zone and redispersing platinum group metals on said catalyst;

(e) continuously circulating said halogen-containing gas from a halogenation gas outlet to a halogenation gas inlet in a halogenation loop and adding a halogen to said halogenation gas loop in an amount determined to maintain a halogen concentration in said adding a halogenation loop;

(f) passing catalyst particles from said halogenation zone to a drying zone, retaining catalyst particles in said drying zone as a second catalyst bed and contacting said catalyst particles with a drying gas comprising a second oxygen-containing gas in said drying zone;

(g) passing said drying gas to a lower portion of said drying zone, measuring the rate of addition of said oxygen-containing gas, generating a third signal representing the rate of addition of said oxygen-containing gas, and passing said drying gas through said drying zone at a second average superficial velocity;

(h) passing said drying gas upwardly through said halogenation zone in admixture with said halogenation gas;

(i) passing at least a portion of said halogenation gas into said burn zone to provide, in part, combustion gas for said burn zone;

(j) comparing said first signal with a first set point for oxygen concentration in the range of from 0.25 to 2.0 mol. %, said second signal with a second set point for gas addition, and said third signal with a set point for gas addition;

(k) charging a third oxygen-containing gas stream to said halogenation gas stream flowing from said halogenation gas outlet to said halogenation gas inlet to supply additional combustion gas to said burn zone to prevent said first, second and third signals from exceeding said first, second and third set points.

* * * * *